United States Patent [19]

Wimer et al.

[11] Patent Number: 5,513,332
[45] Date of Patent: Apr. 30, 1996

[54] DATABASE MANAGEMENT COPROCESSOR FOR ON-THE-FLY PROVIDING DATA FROM DISK MEDIA TO ALL WITHOUT FIRST STORING DATA IN MEMORY THEREBETWEEN

[75] Inventors: Ted L. Wimer, Kuna; Charles Jopson, Boise, both of Id.

[73] Assignee: Extended Systems, Inc., Boise, Id.

[21] Appl. No.: 178,110

[22] Filed: May 31, 1988

[51] Int. Cl.$^6$ ........................................... G06F 13/00
[52] U.S. Cl. .................. 395/427; 395/309; 364/238.4; 364/236.2; 364/243.7
[58] Field of Search ...................... 364/200, 300, 364/900, 200 MS File, 900 MS File; 395/425

[56] References Cited

U.S. PATENT DOCUMENTS

| | | |
|---|---|---|
| 3,312,950 | 4/1967 | Hillman et al. . |
| 3,312,951 | 4/1967 | Hertz . |
| 3,394,354 | 7/1968 | Senzig . |
| 3,665,421 | 5/1972 | Rehhausser et al. . |
| 3,936,803 | 2/1976 | Katzman et al. . |
| 3,936,804 | 2/1976 | Bachman ........................ 364/200 |
| 4,053,949 | 10/1977 | Recca et al. . |
| 4,096,567 | 6/1979 | Millard et al. . |
| 4,247,893 | 1/1981 | Anderson et al. . |
| 4,266,271 | 5/1981 | Chamoff et al. . |
| 4,296,466 | 10/1981 | Guyer et al. . |
| 4,323,990 | 4/1982 | Goode et al. . |
| 4,328,543 | 5/1982 | Brickman et al. . |
| 4,374,409 | 2/1983 | Bienvenu et al. . |
| 4,403,286 | 9/1983 | Fry et al. . |
| 4,430,699 | 2/1984 | Segarra et al. . |
| 4,451,885 | 5/1984 | Gerson et al. . |
| 4,476,528 | 10/1984 | Matsumoto et al. . |
| 4,500,958 | 2/1985 | Manton et al. . |
| 4,506,326 | 3/1985 | Shaw et al. . |
| 4,513,374 | 4/1985 | Hooks, Jr. . |
| 4,531,186 | 7/1985 | Knapman . |
| 4,547,849 | 10/1985 | Louie et al. . |
| 4,562,537 | 12/1985 | Barnett et al. . |
| 4,611,298 | 9/1986 | Schuldt . |
| 4,631,664 | 12/1986 | Bachman . |
| 4,675,806 | 6/1987 | Uchida . |
| 4,700,291 | 10/1987 | Saito . |
| 4,714,989 | 12/1987 | Billings . |
| 4,722,084 | 1/1988 | Morton . |
| 4,727,509 | 2/1988 | Johnson et al. . |
| 4,734,852 | 3/1988 | Johnson et al. . |
| 4,736,290 | 4/1988 | McCallion . |
| 4,739,472 | 4/1988 | Hayashi . |
| 4,742,466 | 5/1988 | Ochiai et al. . |
| 4,809,169 | 2/1989 | Sfarti et al. . |
| 4,811,207 | 3/1989 | Hikita et al. . |
| 4,817,036 | 3/1989 | Millett et al. . |
| 4,847,753 | 7/1989 | Matsuo et al. . |
| 4,956,774 | 9/1990 | Shibamiya et al. . |

Primary Examiner—Krisna Lim
Attorney, Agent, or Firm—Townsend and Townsend and Crew

[57] ABSTRACT

A data base information engine subsystem which examines data on the fly as it is retrieved from a mass storage device (i.e., disk), and before storing it in memory, to select only the specified elements of data required by the host computer according to criteria set forth by the host computer. A page mapper circuit separates the host command processing from the data access processing for the command. The instruction set used by the information engine subsystem contains optimizing algorithms to parse and reorder the required operation to be most efficient (with respect to time). The information engine subsystem also contains a high speed processor which is a special purpose processor designed and optimized for data retrieval while doing operations on the data at high speed.

11 Claims, 5 Drawing Sheets

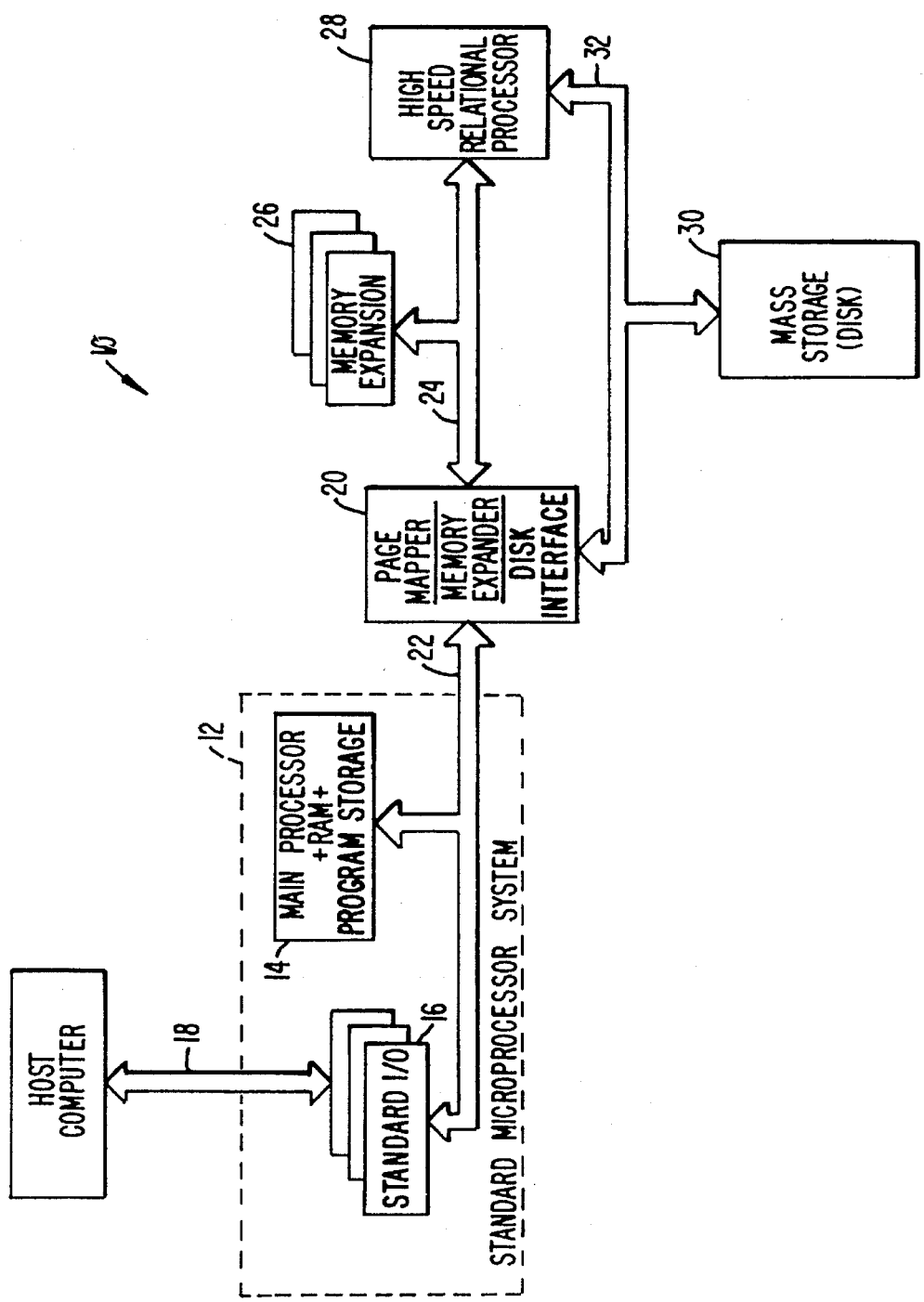
FIG._1.

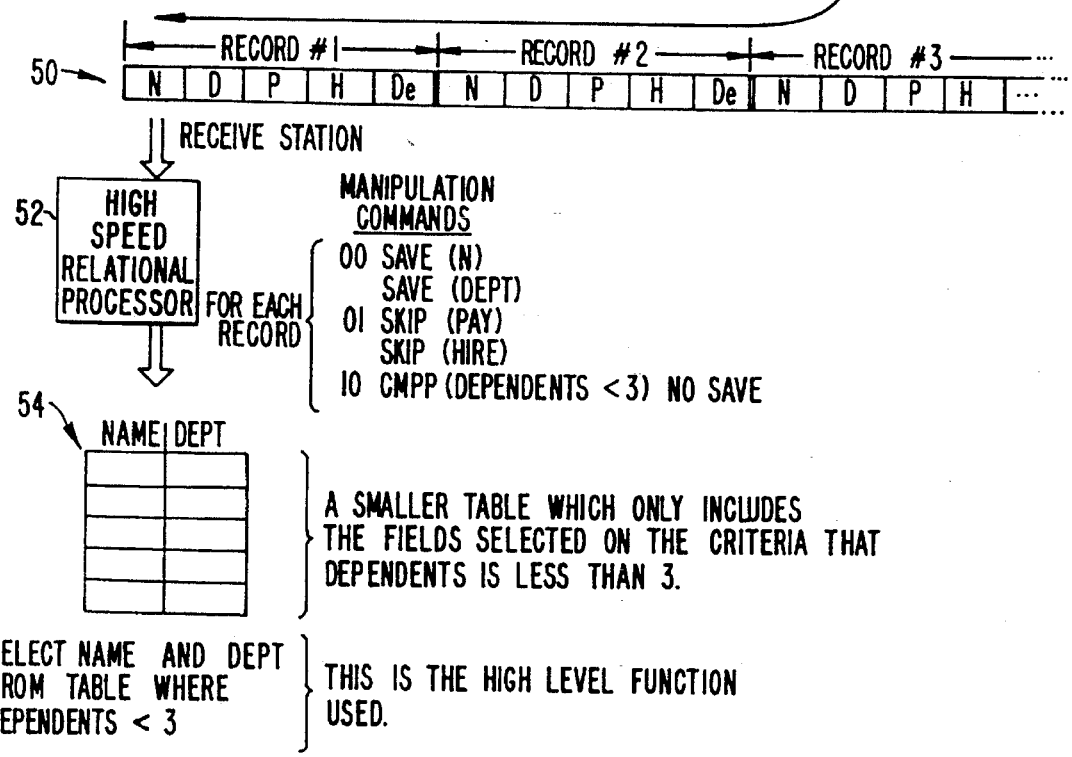
FIG._2.

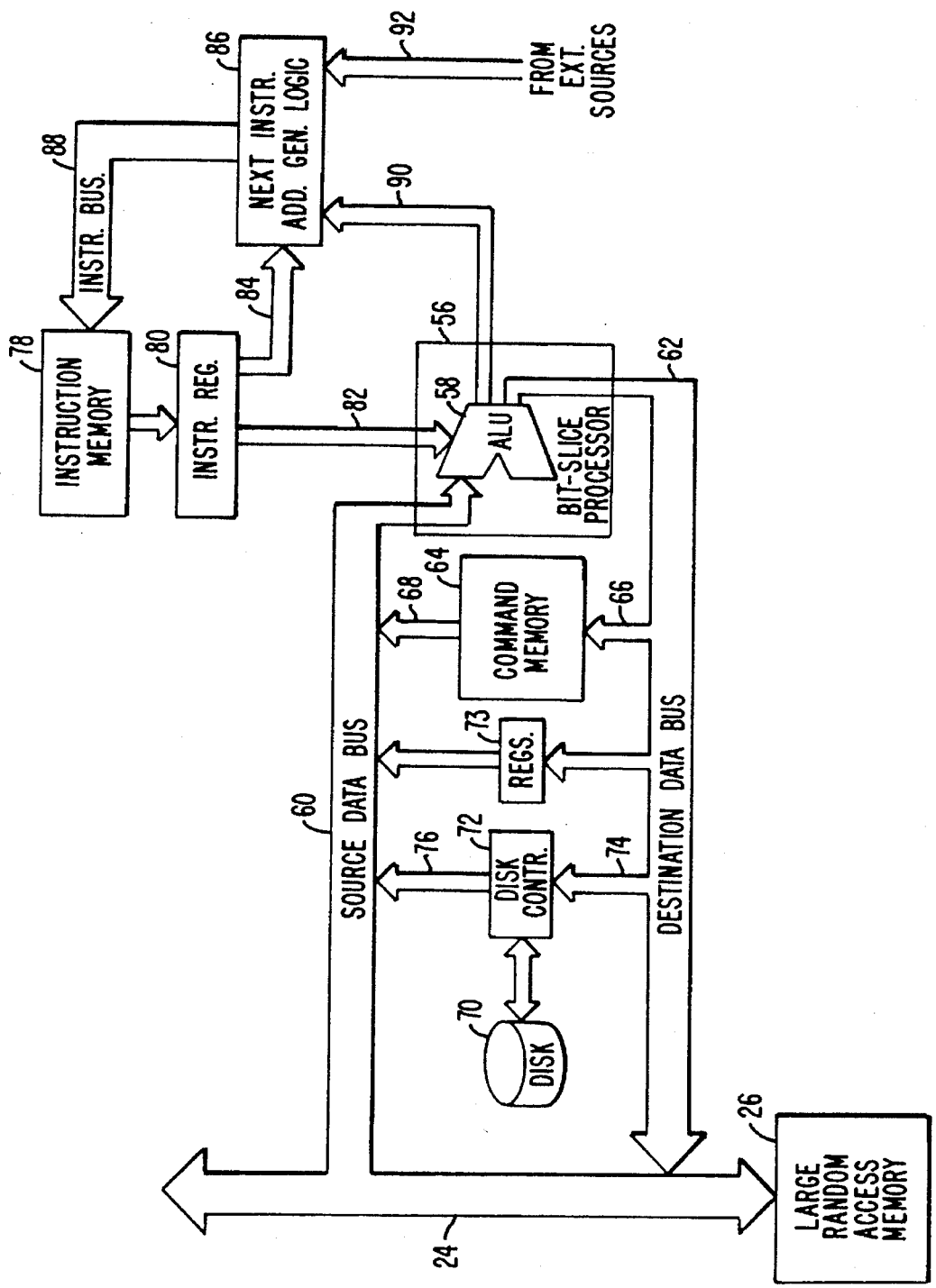
FIG._3.

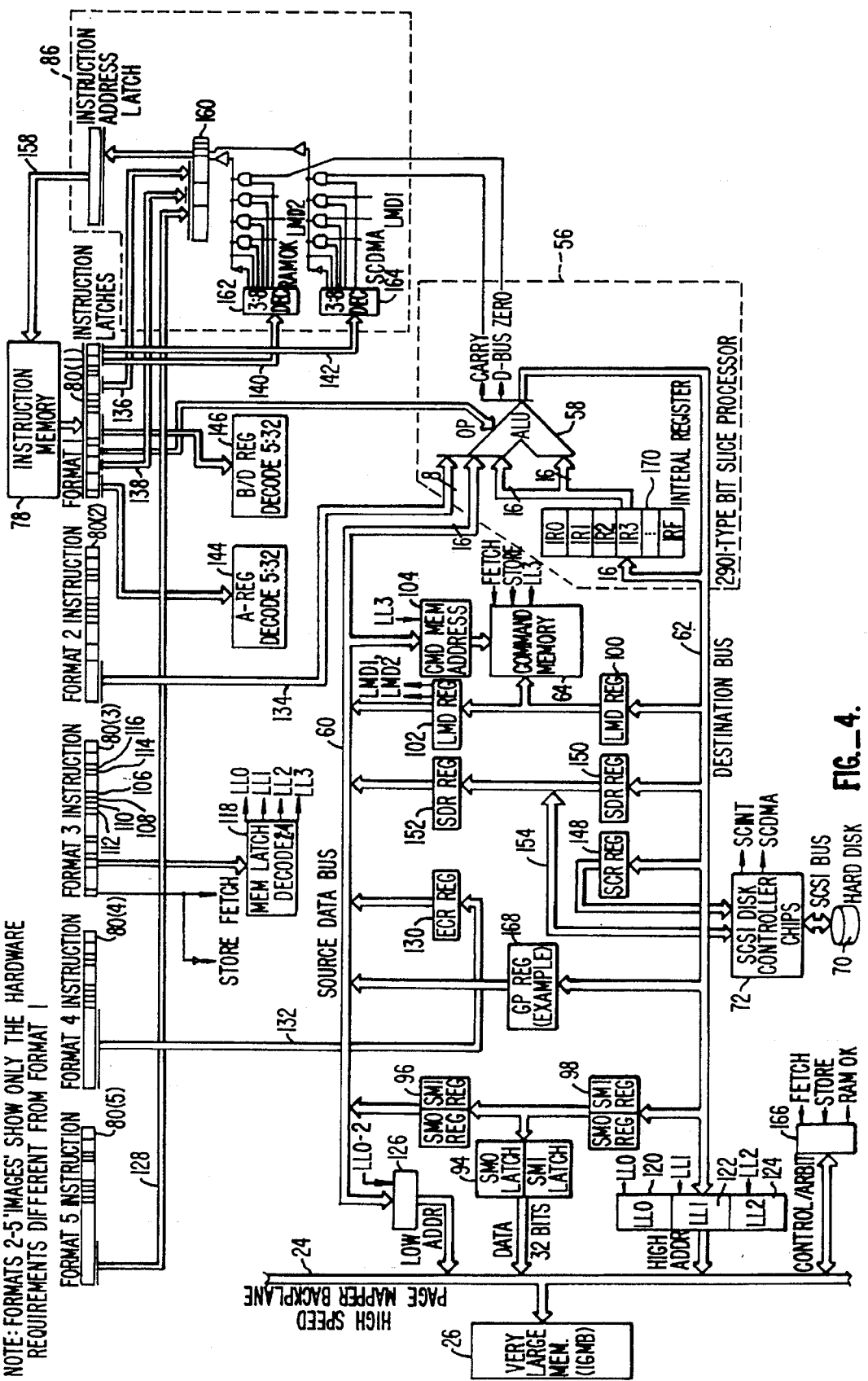
FIG._4.

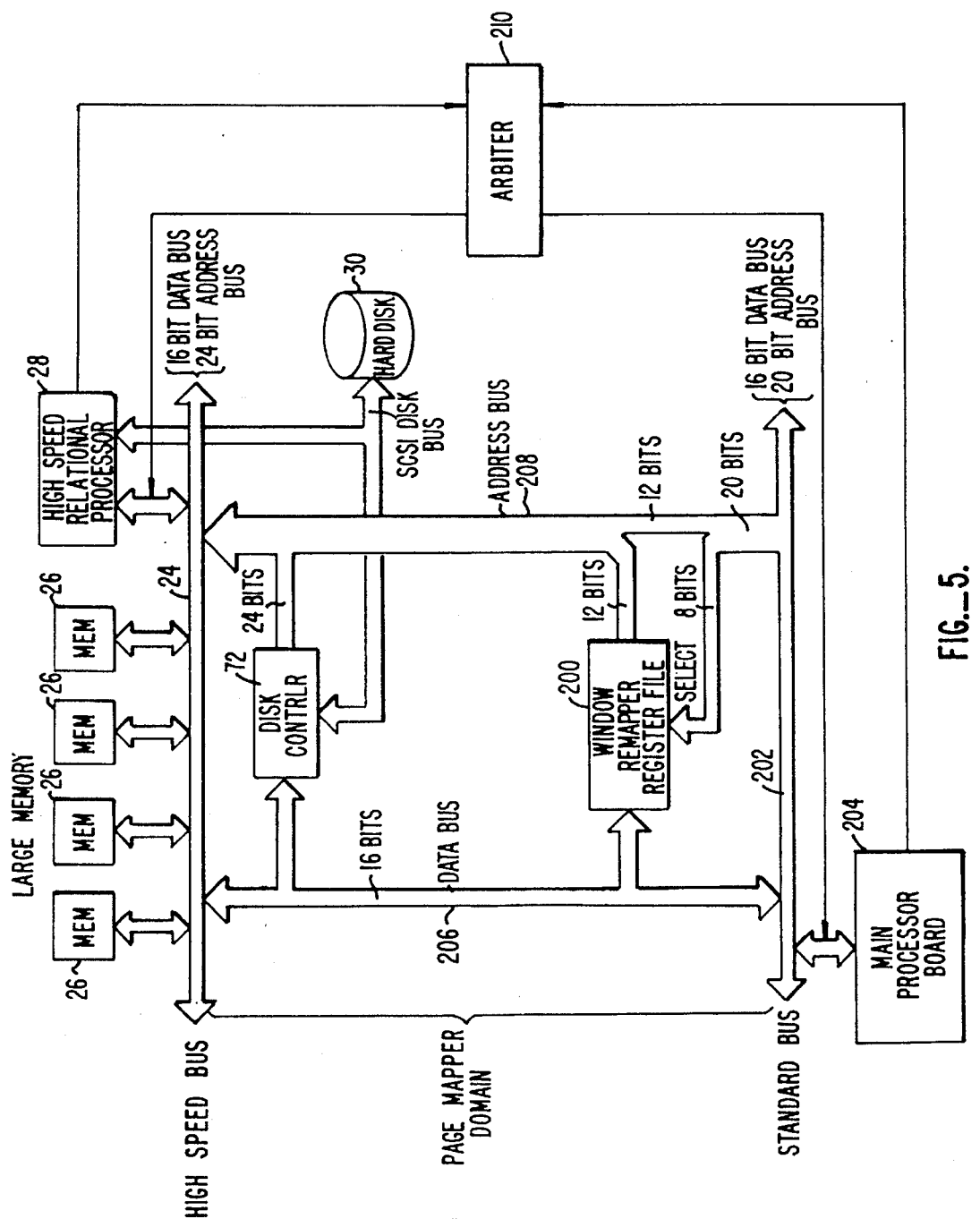
FIG._5.

DATABASE MANAGEMENT COPROCESSOR FOR ON-THE-FLY PROVIDING DATA FROM DISK MEDIA TO ALL WITHOUT FIRST STORING DATA IN MEMORY THEREBETWEEN

The Appendix contains a description of the instruction formats and register assignments of the high speed processor of the present invention.

BACKGROUND

The present invention relates to data servers or data base managers which retrieve data from a mass storage device at a high rate of speed and provide the data to a host computer.

Data base management refers to the storage and retrieval of data in a manner transparent to a host computer user. Such management systems are typically done in software. The host computer which uses a data base manager can be anything from a mainframe to a personal computer in a network.

Personal computers in a network are being used to perform functions previously done by a mainframe, and have access to large databases due to the decreasing costs of memory. At the same time, such personal computers typically have limited input/output (I/O) bandwidth, which means that large amounts of data require a significant amount of time to be loaded into the personal computer. The use of networks with personal computers increases the performance problem since all the data is funneled through the same link. This network bandwidth limitation causes contention problems among the users. Accordingly, it is desirable to have some sort of data base management which retrieves the data at high speed and delivers only relevant data to the host computer.

The major types of data base management systems are (1) hierarchal, (2) network, and (3) relational. The first two types of data base management systems require predefined indexing of the data base so that the data desired can be determined from the index without the need for examining all elements of data. Such indexing systems are required because of the limited speed with which data can be retrieved and examined. For a relational data base, all of the data must be examined.

The "relational data base" concept starts with a logical data model. This model depicts the data in a manner which is consistent with the way we want to view data. The model makes the logical view independent of the physical storage environment. The data structure is simply a table with rows of data (records) and columns which define the domains or fields within the rows, and no predefined indices are necessary. Since no predefined indices are used, the relationships among data items desired by a user do not have to be anticipated when the data base is assembled. Instead, a user can form the relationships desired at the time a query of the data base is made. The following example table (T1) of data shows this relational model:

| Part Number | Inventory Quantity | Unit Cost | Monthly Usage |
|---|---|---|---|
| 3405-0001 | 12 | 6.40 | 42 |
| 3406-0001 | 300 | 1.20 | 200 |
| 3406-0002 | 122 | .43 | 200 |
| 3406-0004 | 6 | 9.22 | 14 |

The most widely accepted access language for the relational model data base is SQL (Structured Query Language), which is used here as an example. It has many optional clauses which give it power with the relational data model. The most simple form is:

| SELECT | <list of columns> |
| FROM | <list of tables> |
| WHERE | <information criteria (boolean expressions)> |

Using this statement only the rows in the table which meet the "where" criteria in the "select" columns are collected (returned to the requestor). For example, using the table, T1, above:

| SELECT | <part numbers> |
| FROM | <T1> |
| WHERE | <inventory quantity is less than monthly use> |

The data returned would be:

3405-0001

3406-0002

3406-0004

The inherent problem with relational data base access is speed. Since there are no linkage or index paths through the data all records (rows) must be examined to see if the select criteria is met.

The relational data base method, like other data base methods, is administered by a data base manager (or data server) which interfaces between a host computer user's program and the stored data. The host computer program requests specific data from the data base manager. (I.e. the data items from the data base which correspond to the given relationship). The data base manager receives the high level request and prepares the data to satisfy the request.

A software data base manager which executes in the host processor retrieves data from a hard disk and puts the data into a random access memory for use by the user's program. The user program tells the data base program what data fields are needed, and the data base program retrieves these fields from the disk and loads them into the random access memory for use by the user program using the host processor at its standard, slower speed.

Some data base manager facilities utilize a separate independent processor. Early versions of this type system were standard processors running standard software for data retrieval. In these systems the data base management function is split between the host processor and the data server. The data server sent all data to the host and the host program provided the data base access algorithms to select the desired data.

Later versions of the data base managers utilizing separate processors have moved the data base access algorithms into the separate processor. In these systems the data base processor is a processor just like the host processor such that the same software data base management program can be executed in both. In this technique data is retrieved from a disk at high speed and stored in random access memory. The data in the random access memory is then examined by the processor of the data server to determine the appropriate portions to send on to the host computer, via the network link.

Because of the time required for storing the data in random access memory, doing the comparison, and restoring the desired data, indexing is beneficial to all of these data base management techniques.

Typically, a general purpose computer is used for a data server. Such a general purpose microprocessor will have a data and address bus coupled to an external memory for both storing data and storing a program which will run the microprocessor. The same bus is used for both fetching instructions from memory and for doing operations dictated by that instruction which require data or addresses to travel over a bus. Accordingly, some form of bus arbitration is needed.

The processing of data is slowed by the time required to fetch and decode instructions. In order to speed the instruction fetch time, a next instruction is typically fetched before the current instruction is decoded to give an instruction "pipeline", with the next instruction entering the pipe before the current instruction leaves the pipe. This will speed operation in the usual case where the next instruction fetched is determined by simply incrementing a program counter, but will be a wasted fetch where the decoded current instruction contains a jump to another location for the next instruction.

A jump is typically done by loading a jump (or branch) address into a program counter in response to a jump instruction. The next instruction is stored in a push-down stack of registers so that it can be saved upon a return from the subroutine which the program is jumping to. In addition, the push-down stack can be used to store any constants which are in general purpose registers used by the processor, since these constants may be lost by the use of the registers by the subroutine.

SUMMARY OF THE INVENTION

The present invention is a data base information engine subsystem which examines data on the fly as it is retrieved from a mass storage device (i.e., disk), and before storing it in memory, to select only the specified elements of data required by the host computer according to criteria set forth by the host computer. A page mapper circuit separates the host command processing from the data access processing for the command. The instruction set used by the information engine subsystem contains optimizing algorithms to parse and reorder the required operation to be most efficient (with respect to time). The information engine subsystem also contains a high speed processor which is a special purpose processor designed and optimized for data retrieval while doing operations on the data at high speed.

The high speed processor contains an arithmetic logic unit (ALU) which has an input coupled to the disk interface. Data pulled off the disk is first processed through the ALU for comparison or other functions to determine if the data should be stored in main memory. If the data meets the selection criteria as implemented by the control of the ALU, the output of the ALU is provided to a large random access main memory. The data retrieved from the disk is thus directed through the ALU before it can be stored in main memory. This structure eliminates the need to store all data in main memory first, and then do the required comparison or other functions to select the desired data. Instead, this comparison and other selection criteria are performed in real time as the data is pulled off of the disk.

The high speed processor uses a unique four bus, three memory architecture. In addition to the interface to the main, data storage memory, there is a separate instruction storage memory and a command storage memory. A dedicated instruction fetch bus couples the instruction storage memory to an instruction register. A dedicated data source bus provides external data to the ALU and data from the hard disk to the ALU. A data destination bus provides the output of the ALU to the external, main memory and to internal registers. Finally, a command fetch/store bus couples the command memory between the destination data bus and the source data bus. This structure allows instruction fetches to be done in parallel with the execution of an instruction which requires the use of a source data bus and/or the destination data bus.

The architecture provides for dynamic generation in real time of the next instruction's address. This is done by a logic circuit which receives information from both the current instruction and machine branch conditions from other parts of the processor. No instruction counter (which creates the next instruction address by incrementing) is used. Because of the dedicated nature of the processor as a data retriever, the instruction set uses a straight line code system which uses branches, but not subroutines which must return to a starting address. At the completion of all branches, the program simply restarts for the next field of data. Accordingly, no saving of a return address is needed for a jump or branch, thus eliminating the need for a stack. In addition, pipelining is not necessary because of the immediate determination of the next instruction's address. Also, enough registers are provided for dedicated purposes to eliminate the need for saving constants in a register stack.

The page mapper separates the main processor bus from the large memory, disk storage bus. This allows query processing set-up to be independent of the data accessing. In a multi-user system, this allows operation overlap. The high speed processor stores the selected disk data into the page mapper's memory.

The page mapper circuit, in addition to interfacing the slow, narrow bus of the main processor with a high speed, wide bus used by the high-speed processor, remaps pages of logical address space onto pages of real address space memory. This allows a very large memory space to be used efficiently by a processor which intrinsically has a very limited address space. This remapping is done by segmenting the memory into regions accessed by programmable page registers. This way a limited number of hardware registers can remap segments of memory, transforming a processor's limited address space into segments of a much larger memory space.

For the implementation of the present invention for a relational data base using SQL, an instruction set is used with optimizing algorithms which parse and reorder the required operations. These algorithms reorder the primitive operations of a query command into a sequence which reduces the overall amount of data being examined as quickly as possible.

For a fuller understanding of the nature and advantages of the invention, reference should be made to the ensuing detailed description taken in conjunction with the accompanying drawings.

BRIEF DESCRIPTION OF THE DRAWINGS

FIG. 1 is an overall block diagram of an information engine subsystem according to the present invention coupled to a host computer;

FIG. 2 is a schematic diagram showing the selection of data fields according to the present invention;

FIG. 3 is a high level block diagram of the high speed relational processor of the present invention;

FIG. 4 is a more detailed block diagram of the processor of FIG. 3; and

FIG. 5 is a block diagram of the page mapper circuit of the present invention.

DETAILED DESCRIPTION OF THE PREFERRED EMBODIMENTS

FIG. 1 shows an information engine subsystem 10 according to the present invention. A standard microprocessor system 12 includes a processor with its own random access memory (RAM) and program storage memory 14 and standard I/O ports 16. These are coupled via a bus 18 to a host computer. Processor system 12 receives data requests from the host computer, and parses and executes these requests. Among the functions performed are determining the authority for the operation, the locality of the data base necessary, the referential requirements, the memory/cache management, the lower level relational operations necessary to complete the task, the data dictionary accesses required, the controls necessary to allow shared data concurrency and recovery requirements.

A page mapper circuit 20 is coupled to microprocessor system 12 via a bus 22. Page mapper 20 is also coupled to a wide, high speed bus 24 which is coupled to a very large memory 26.

A high speed processor 28 examines data as it is pulled off of a disk 30 on a bus 32 and provides the selected data to memory 26. Thus, not all of the data pulled off of disk 30 is applied into memory 26, but only the data which meets the selection criteria. The data stored in memory 26 can then be provided to be host through buses 24, 22 and 18.

The present invention can be used for many different types of data base systems, but has particular efficiency with a relational data base. The formation of a relational data base and the operation of the present invention on such a data base is shown in the diagram of FIG. 2. The data base consists of a table 34 having rows numbered 1–N corresponding to individual records and columns 36, 38, 40, 42 and 44 corresponding to different fields in a particular record. In the example shown, the first field 36 contains the name of an employee, the second field 38 contains the department to which that employee is assigned, the third field 40 sets forth the pay of that employee, the fourth field 42 sets forth the hire date of that employee and the last field 44 sets forth the number of dependents of that employee. This table is then stored in an area 46 on a disk 48.

In one example, a host computer may desire to find the names of all employees (and their departments) who have fewer than three children. This request is sent to main processor 12 of FIG. 1 which parses the request accordingly and identifies the location of area 46. This information is sent to high speed processor 28, which pulls the data from area 46 off in sequential form as a series of fields 50. This data is then sent through high speed relational processor 52 which compares the field 44 of each record to the number 3 and passes on only those records in which the number of dependent children is fewer than three. In addition, in this example, only the name and department fields of those records are passed on and stored in memory 26 in an area 54 shown in FIG. 2.

One possible format of the high level function used would read as follows:
Select: Name and Department
From: Table Where: Dependents less than 3.

The particular manipulation commands for each record would be as follows:
Save (Name)
Save (Department)
Skip (Pay)
Skip (Hire)
Compare (Dependents less than 3) No Save.

FIG. 3 is a block diagram of high speed relational processor 28 of FIG. 1. Large memory 26 is accessed by wide, high speed bus 24. The high speed processor uses a bit slice processor 56 which includes an ALU 58. For the data path between the ALU and the large memory, the input to the ALU is provided on a source bus 60 from large memory 26 and the ALU output is provided on a destination bus 62 to large memory 26 through bus 24. The commands containing the criteria for the data selection are loaded into a command memory 64 from source bus 60, through processor 56 and destination bus 62 to an input portion 66 of a command bus having an output portion 68.

A hard disk 70 is accessed by a disk controller 72 which receives control commands on a bus 74 from destination bus 62 and provides data from disk 70 to source bus 60 on a intermediate isolation bus 76. Thus, the data from disk 70 travels through disk controller 22, bus 76 and source bus 62, ALU 58 and processor 56. The appropriate operations are performed on the data and the selected data is then provided on destination bus 62 to large memory 26. Data can be transferred from the ALU to the disk on bus 62, isolation bus 74 and disk controller 72. In addition, various control and data registers 73 can be accessed by the ALU or provided to the ALU through source bus 60 and destination bus 62.

The instructions which execute the commands of command memory 64 are stored in a separate instruction memory 78, which is preferably a read only memory (ROM). These instructions are provided to an instruction register 80 which provides control lines 82 to processor 56. In addition, certain bits 84 are provided to instruction address generation logic 86. Logic 86 generates the next instruction address on an instruction fetch bus 88 from inputs 84 as well as control inputs 90 from processor 56 and external conditions on inputs 92.

FIG. 4 shows the circuit of FIG. 3 in more detail. As discussed with reference to FIG. 3, commands are entered via source data bus 60, through processor 56 and destination bus 62 to command memory 64. The program in ROM 78 is used to provide the command memory address through register 104 such that commands may be loaded into command memory 64. The commands and other data from bus 24 pass through a latch 94 since bus 24 is asynchronous with respect to data bus 60. The output of latch 94 is then supplied to a register 96. Register 96 has a counterpart 98 for outputs to bus 24 from bus 62. Although two registers 96 and 98 are used, they could be replaced with a single, tri-state register. Two registers are shown as a matter of design choice. Similarly, two LMD (Local Memory Data) registers 100 and 102 are shown, but could be embodied as a single register for coupling buses 60 and 62 to command memory 64. The command memory address register 104 supplies the addresses to command memory 64 from bus 60.

Commands are fetched from command memory 64 into LMD register 102 by appropriate control signals from instruction latch 80. Instruction latch 80 is shown in five forms, labeled 80(1), 80(2), 80(3), 80(4), and 80(5). All of these designations refer to a single instruction latch which has control lines to different elements hard-wired. The particular elements enabled depend upon the format of the instruction and are shown by the five configurations of FIG. 4. Format bits 106 and 108 are decoded to provide the appropriate enabling control signals by the decode circuitry (not shown). Additional format bits 110, 112, 114 and 116 may be used as well if bits 106 and 108 contain the designation "11". These five formats are described in more detail in the Appendix attached hereto.

As can be seen, for format 3, which is used for fetching and storing data, a fetch and store signal are generated and supplied to command memory 64. In addition, a memory latch decode circuit 118 provides signals LL0, LL1, LL2 and LL3. Signal LL3 is provided to the command memory while the remaining signals are provided to memory page select registers 120, 122 and 124. These registers select the appropriate page (or area) of memory in which the data is stored. The lower level bits for choosing the appropriate location in each page (or area) of memory are generated by a register 126 which is enabled by any of signals LL0, LL1 or LL2.

The format 5 instruction is used for long distance branches, and provides bits for next address generation on lines 128 to next address generation logic 86.

The format 4 instruction is used to load a constant into an ECR (External Constant Register) register 130 on line 132. This constant can then be accessed on the next instruction cycle via source bus 60.

The format 2 instruction is used for masking, comparing, complimenting, incrementing, etc. A constant field from this instruction is supplied directly to ALU 58 on line 134.

Finally, the format 1 instruction is used for general purpose, two register operations for comparing, subtracting, ANDing, ORing etc. Bits are provided for next address generation on lines 136, 138, 140 and 142. Bits are also provided to an A register decode circuit 144 and a B/D register decode circuit 146. These decode circuits select the appropriate registers to be enabled to supply their data to ALU 58 in bit slice processor 56. The B/D register decode circuitry 146 also selects the appropriate register to be enabled to receive the data from ALU 58 in processor 56.

Data is accessed from hard disk 70 by an SCSI disk controller 72 which receives control signals from an SCR (SCSI Control Register) register 148. Data to be written onto the disk is first held in an SDR register 150, while data read off the disk is held in an SDR register 152. As can be seen, data read off the disk must pass from controller 72 along bus 154 to SDR register 152, to source data bus 60, through ALU 58 to destination bus 62. From there, the data can pass through register 98, latch 94 and bus 24 to memory 26. The data from the disk must thus pass through bit slice processor 56 in order to reach the large memory 26.

Next address Generation logic 86 is shown as containing an instruction address latch 156 which provides an address on bus 158 to instruction memory 78. Instruction address latch 156 receives its bits from a register 160. Although a latch 156 and register 160 are shown for sake of understanding, in actual implementation only a single latch or register need be used, or some combination thereof. As can be seen, register 160 receives inputs directly from instruction latch 80 and, for two of the bits, from one of a series of AND-gates which are activated by decode logic gates 162 and 164. These logic gates decode bits 140 and 142 from the instruction latch. The output of decoders 162 and 164 either provide a noninverted or inverted direct signal to register 160 or enable one of a series of AND-gates which are coupled to receive control signals from elsewhere in the circuit. For instance, a carry signal from ALU 58 is provided to one AND-gate and a D-Bus Zero signal, indicating that the results of the ALU operation are all 0, is supplied. The combination of carry and D-Bus Zero signals are enough to tell whether two numbers being compared are the same, or one is greater or lesser than the other.

Other signals shown include LMD1 and LMD2 from LMD register 102 which allow four different branch possibilities from a command stored in LMD register 102. A SCDMA signal from SCSI disk controller 72 is used for another branch condition and signal SCINT provides an alert for an abnormal condition detected by SCSI disk controller 72. Another signal is the RAM OK signal from memory arbitration register 166. This register is used because of the asynchronous quality of bus 24 which requires a signal indicating when latches 94 and 120–126 have been strobed to memory.

The circuit of FIG. 4 also includes a number of general purpose registers 168 and bit slice processor 56 includes internal registers 170. The internal registers 170 are used for housekeeping to store constants and keep counters. Bit slice processor 56 was chosen for the embodiment of FIG. 4 because it contained ALU 58. Internal registers 170 are not necessary for the design of FIG. 4, and external registers could be used with a dedicated ALU.

As can be seen, the processor design of FIG. 4 differs from standard processors in a number of ways. This is possible because of the special capabilities of the processor in FIG. 4 of retrieving data in accordance to criteria as supplied by commands stored in command memory 64. For example, next address generation logic 86 does not contain a program counter. Registers 160 and latch 156 perform this function instead, and generate the next instruction address at the same time that the instruction in instruction latch 80 is being executed. This speeds up the instruction fetch operation and is possible not only because of the next address generation circuit but the use of a separate instruction fetch bus 158 which does not have to contend with arbitration on a common bus as in the prior art since separate source and destination buses 60 and 62 are used.

Direct branching without the need to store a return address, constants and a stack pointer is possible since the nature of the data retrieval does not require a return from a branch, but simply the branching down various paths to the end for each data field. The program then starts over at the beginning for a new instruction sequence. Accordingly, there is no stack or stack pointer used in the present invention.

FIG. 5 is a block diagram showing the operation of the page mapper of the present invention. The page mapper uses a register file 200 which is coupled between high speed bus 24 and a standard bus 202 which is coupled to a main processor board 204 and to the host computer (not shown). Main processor board 204 contains the main processor along with its associated memory 14 as shown in FIG. 1.

A data bus 206 interconnects buses 202 and 24. An address bus 208 also interconnects buses 202 and 24 with 8 bits from address bus 208 being converted into 12 bits by register file 200.

When processor board 204 desires to interface with a portion of large memory 26, it generates the 12 bits for each memory location corresponding to the area, or page, of memory and loads these 12 bit values into register file 200 via data bus 206. Thereafter, a memory access is performed by providing the addresses on bus 208 with 8 bits of the address being converted into 12 bits by selecting the appropriate register in register file 200. After a series of operations is completed and main processor 204 desires to interface with a different area of memory, a different set of values are written into register file 200. The memory associated with main processor 204 will store the 12 bit remapping values used for the previous page of memory, or will store an algorithm for generating those 12 bit values.

Thus, the 20 bit address can be mapped into a 24 bit address dynamically. This provides an advantage over prior art virtual memory mechanisms in which the software detected extra bits in an address and had to process an algorithm to determine where to go for the data in the midst of a data access attempt. This algorithm would be triggered by a page fault mechanism. The present invention eliminates the need for such a page fault mechanism and its triggering of a recovery algorithm.

The page mapper (remapper) allows a very large memory with a wide address bus to be accessed by a narrow address bus. Register file 200 converts an 8 bit window address into a 12 bit address for access to physical storage. The 8 bit code selects a 12 bit register which provides its data output to the address bus as 12 bits of address.

During setup, main processor 204 writes a 12 bit pattern at the location selected by the 8 bit address. This establishes the window-to-physical storage relationship. In operation, the upper 8 bits of the address select a register location which causes the 12 bit pattern to be read and sent on to select the physical memory page.

FIG. 5 also shows an arbiter 210 which arbitrates who has access to memory 26 between high speed processor 28 and main processor 204. When either of the processors desires access to memory, it sends a request to arbiter 210, which then enables a tri-state transceiver coupling the processor to a bus. The arbiter will multiplex between the two processors, allowing each to process 2 bytes at a time.

The system is synchronous because the clock for main processor 204 is provided for the rest of the system, including high speed processor 28.

The present invention also speeds up the accessing of data where multiple passes of the data through the ALU are required. The first pass is done on the fly as data is accessed from the disk and processed through the ALU according to a first criteria before putting the data into main memory. The second pass is then done by selecting the data from main memory, passing it through the ALU with the second criteria and restoring it in another part of main memory for transfer to the host computer.

As will be understood by those familiar with the art, the present invention may be embodied in other specific forms without departing from the spirit or essential characteristics thereof. For example, instead of using five formats for instruction latch 80, a larger latch could be used with different dedicated fields in the latch. In the page mapper circuit, a different number of addresses or data lines could be used. The technique of the present invention is described with respect to a hard disk, but could be used with any source of data, such as a data channel from another processor or network. In addition, the AND-gates of the next address generation logic could be replaced with NAND gates or other logic configurations could be used. Accordingly, the disclosure of the preferred embodiments of the present invention is intended to be illustrative, but not limiting, of the scope of the invention which is set forth in the following claims.

APPENDIX

HIGH SPEED PROCESSOR MICRO-INSTRUCTION FORMATS

FORMAT 1:

| EXT | CA (4) | CX (3) | | OP (3) | EXT | CB/D (4) | | NB | ND | 0 | 0 | CV (4) | | CEX | FCN | CH (3) | CL (3) |
|---|---|---|---|---|---|---|---|---|---|---|---|---|---|---|---|---|---|

General Purpose, two register operations for comparing, subtracting, and'ing, or'ing, etc. Next address selection is generated from 9 bits (512 addresses). The CH and Cl each contribute one bit to the next address, 4-way branching is selected on externally sensed conditions as specified by the CH and CL field decodes. The CV field and the CX field also contribute to the next address generation.

The A-bus entry for the ALU operation is selected via the CA field. The EXT modifier bit for the CA field is reversed from the CB/D field register selection. The EXT for CA is set to 0 for external registers. The EXT for CB/D is set to 1 for external registers.

The B-bus source register selection also selects the D-bus (destination bus) via the CB/D field. The NB and ND bits modify the use of the CB/D field decode. If NB=1, the CB/D decode will not select the any B-bus source register. ND=1 means to suppress the CB/D decode from selecting any destination. Regardless of NB or ND, any ALU operation is completed and conditions set depending on the result (D=0 and CARRY) are still set.

The ALU operation is specified by the OP field. The CEX and FCN fields are used to specify how to use prior "saved carry-out" conditions and how to save the current result.

NOTE:

Can't select CA and CB both from the external set of registers since they both use the direct data input on the bit-slice. Can set the CA and CD both to external registers if the B-bus is suppressed (NB=1).

FORMAT 2:

| CK (8) | | OP (3) | EXT | CB/D (4) | | NB | ND | 0 | 1 | CV (4) | | CEX | FCN | CH (3) | CL (3) |
|---|---|---|---|---|---|---|---|---|---|---|---|---|---|---|---|

General purpose, one register with constant field emit for masking, comparing, complementing, incrementing, etc. The upper 8 bits of the constant field are set to 0.

Next address generation uses 6 bits (64 words) the CL, CH and CV fields. The 4-way branch selected by up to 2 external conditions.

NOTE:

If the constant is in the low half (with the high half set to zero) and you want it in the high half, can set it to the BSR (byte swap register) using this instruction, and when it gets used it will come out with the low half zero and the high half with the constant.

Can set a constant into an external register if NB=1. (Since the data emit must use the source bus). Must move the constant to an internal register if want to do 'OR' or 'AND' with an external register.

FORMAT 3:

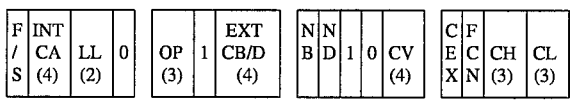

This instruction is for fetching and storing data from/to memory. The address generation is derived from only 6 bits (64 addresses) from the CL and CH 4-way results plus the CV.

The LL bits determine which memory the operation is for. If the LL bits=3 (binary 11), the local ram is accessed. The data accessed in local memory is via the LMD register. If the LL=0, 1 or 2 system memory is accessed. The system memory access address is made up of two registers: the 6 bit DAR-HI (Data Address Register) and the 16 bit DAR-LO. There are 3 DAR-HI registers which are destination-only registers. The system memory data is accessed via the SM0 and the SM1 registers.

The DAR-LO comes from register (external) selected by the CB/D decode in the instruction. The value of the register prior to the ALU OP is used as the DAR-LO. The value after the ALU OP is stored back into the CB/D register unless ND=1.

The LL field determines which DAR-HI register to use. The F/S bit determines whether the memory access is for fetch or store. (F/S=1 means fetch).

The ALU operation is executed. Typically the ALU will want to increment the CB/D register for the next memory access. Any constant (other than 1) used to increment will be in the CA decode (which must specify an internal register).

A system memory fetch or store does two 16 bit words at a time. The low order word is always written to an even word memory location. DAR-LO bit 0 is PC bus address bit 2. RAMOK is a CL branch bit used to determine memory access status. It must be active before using this command or accessing the data registers, since it takes several clock cycles to access the system memory.

For local ram access there is DAR-LO only and it is an 11 bit address. The data is accessed on a 16 bit word basis. On reads, the data is available in the local data register LMD for the next instruction.

NOTE:
This requires CB/D to be external register in order to have access to the DAR.

FORMAT 4:

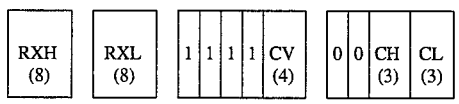

This instruction loads the 16 bit constant (RXH||RHL) into the ECR register (EXT#8). The value can be accessed on the following instruction cycle. The next address generation uses only 6 bits (64 addresses).

Format decode is augmented by the CEX and FCN fields in combination with the other format bits being all 1's.

FORMAT 5:

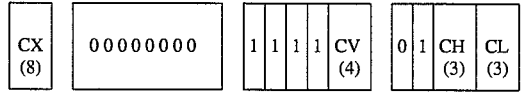

This instruction is used to make LONG distance branches, since it is the only instruction format with access to all 16384 instruction addresses. It uses 14 bits for next address generation CL, CH, CV and CX.

HIGH SPEED PROCESSOR DECODES ASSIGNMENT

| Decode | CA Reg | CB Reg | CD Reg | ALU OP | CH | CL |
|---|---|---|---|---|---|---|
| 0 | GP0 | IR0 | IR0 | + | 0 | 0 |
| 1 | GP1 | IR1 | IR1 |   | 1 | 1 |
| 2 | GP2 | IR2 | IR2 | − | RAMOK |   |
| 3 | BSR | IR3 | IR3 | / | SCINT | SCDMA |
| 4 | SM0 | IR4 | IR4 | . | LMBR9 | LMBR8 |
| 5 | SM1 | IR5 | IR5 | ? | GP1B0 | GP0B0 |
| 6 | SDR | IR6 | IR6 | @ | CARRY |   |
| 7 | LMD | IR7 | IR7 | $ | CAPTC | DBUS0 |
| 8 | ECR | IR8 | IR8 |   |   |   |
| 9 |   | IR9 | IR9 |   |   |   |
| A |   | IRA | IRA |   |   |   |
| B |   | IRB | IRB |   |   |   |
| C |   | IRC | IRC |   |   |   |
| D |   | IRD | IRD |   |   |   |
| E |   | IRE | IRE |   |   |   |
| F |   | IRF | IRF |   |   |   |
| 10 | IR0 | GP0 | GP0 |   |   |   |
| 11 | IR1 | GP1 | GP1 |   |   |   |
| 12 | IR2 | GP2 | GP2 |   |   |   |
| 13 | IR3 | BSR | BSR |   |   |   |
| 14 | IR4 | SM0 | SM0 |   |   |   |
| 15 | IR5 | SM1 | SM1 |   |   |   |
| 16 | IR6 | SDR | SDR |   |   |   |
| 17 | IR6 | LMD | LMD |   |   |   |
| 18 | IR8 | ECR | LL0 |   |   |   |
| 19 | IR9 |   | LL1 |   |   |   |
| 1A | IRA |   | LL2 |   |   |   |
| 1B | IRB |   | SCR |   |   |   |
| 1C | IRC |   |   |   |   |   |
| 1D | IRD |   |   |   |   |   |
| 1E | IRE |   |   |   |   |   |
| 1F | IRF |   |   |   |   |   |

HIGH SPEED PROCESSOR REGISTER ASSIGNMENTS

External Source Registers:

| | |
|---|---|
| GP0 = 0: | General purpose register |
| GP1 = 1: | General purpose register |
| GP2 = 2: | General purpose register |
| BSR = 3: | Byte swap register (store contents into reg and when read back the bytes are swapped) |
| SM0 = 4: | System memory data 0; Low order, even word |
| SM1 = 5: | System memory data 1; High order, odd word |
| SDR = 6: | SCSI data register (two bytes in stream sequence) |
| LMD = 7: | Local memory data (branch on bits 9 & 8) |
| ECR = 8: | Constant from FORMAT 4 instructions (16 bits) |

External Destination Registers:

| | |
|---|---|
| GP0 = 0: | General purpose register |
| GP1 = 1: | General purpose register |
| GP2 = 2: | General purpose register |
| BSR = 3: | Byte swap register (see above) |
| SM0 = 4: | System memory data 0 |
| SM1 = 15: | System memory data 1 |
| SDR = 16: | SCSI data register |
| LMD = 17: | Local memory data |
| LL0 = 18: | LL=0 DAR-HI register |
| LL1 = 19: | LL=1 DAR-HI register |
| LL2 = 1A: | LL=2 DAR-HI register |
| SCR = 1B: | SCSI control register |

| HIGH SPEED PROCESSOR CARRY HANDLING BITS ||||
|---|---|---|
| CEX | FCN | FUNCTION |
| 0 | 0 | Carry-in forced to 0 |
| 0 | 1 | Carry-in forced to 1, capture carry-out |
| 1 | 0 | Carry-in forced to 0, capture carry-out |
| 1 | 1 | Carry-in from old carry-out, capture new carry-out |

Detail (Field Level) Commands:

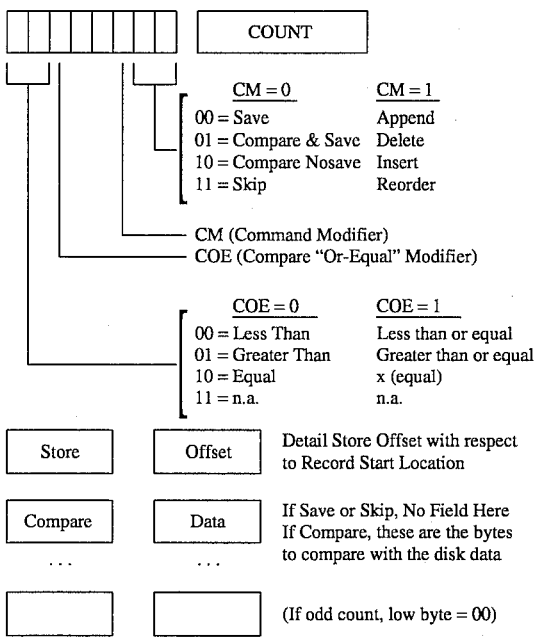

What is claimed is:

1. A data retrieval processor comprising:

a disk interface coupled to a disk memory;

an arithmetic logic unit (ALU);

source data bus means, coupling said disk interface to an input of said arithmetic logic unit, for providing data from said disk memory directly to said input of said ALU without storing said data in a memory first;

command memory means for storing criteria downloaded from an external host computers;

means, having an input for receiving said criteria from said host computer, and having an output coupled to said ALU, for selecting data with said ALU which meet said criteria, wherein only said selected data is provided to said output of said means for selecting; and a destination data bus coupling said output of said means for selecting to said random access memory.

2. The system of claim 1 wherein said disk memory is a hard disk.

3. The data retrieval processor of claim 1 further comprising:

an instruction storage memory;

an instruction register having an output coupled to an input of said ALU;

an instruction fetch bus coupling said instruction storage memory to said instructions register; and a command memory bus coupling said command memory means between said destination data bus and said source data bus.

4. The system of claim 3 further comprising a plurality of data lines coupled between an output of said instruction register and an input of said arithmetic logic unit for providing data directly from said instruction register to said arithmetic logic unit.

5. The system of claim 3 further comprising:

a decoding circuit having inputs coupled to outputs of said instruction register; and a plurality of page map memory registers having enable inputs coupled to outputs of said decoding circuit, and outputs coupled to address different sections of a random access memory.

6. The system of claim 3 further comprising an external constant register having inputs coupled to outputs of said instruction register for storing a constant from one instruction for use with a second instruction.

7. The system of claim 3 further comprising a disk control register having inputs coupled to outputs of said instruction register and outputs coupled to control the operation of said disk interface.

8. The data retrieval processor of claim 1 further comprising:

an instruction storage memory;

an instruction register having an output coupled to a control input of said ALU; and logic means, having an input coupled to receive at least one bit from said instruction register and at least one bit from another register in said processor, for providing a next instruction address to said instruction storage memory.

9. The data retrieval processor of claim 1 further comprising:

a plurality of page map memory registers having inputs coupled to said means for selecting and outputs coupled to different address sections of a random access memory.

10. The data retrieval processor of claim 1 wherein:

an information bus is coupled between said disk interface and a random access memory;

a main processor bus couples said host computer to a main processor, said main processor bus having a smaller number of bits than said information bus;

a page mapper data bus couples said main processor bus to said information bus;

a page mapper address bus couples said main processor bus to said information bus; and a page mapper memory has data inputs coupled to said page mapper data bus, address inputs coupled to a portion of the bits of said page mapper address bus, and outputs for a larger number of bits than said portion of address bits coupled to said information bus.

11. A method for retrieving selected data from a database in a data source which meet criteria determined by a host computer using a separate processor having an arithmetic logic unit (ALU) and placing said data in a main memory, comprising the steps of:

providing data from said data source to said ALU without first storing said data;

selecting with said ALU said data which meet said criteria; and storing said selected data in said main memory.

* * * * *